US009325540B2

(12) United States Patent
Zhang et al.

(10) Patent No.: US 9,325,540 B2
(45) Date of Patent: Apr. 26, 2016

(54) METHOD AND APPARATUS FOR MITIGATING INTERFERENCE IN A WIRELESS NETWORK THROUGH USE OF TRANSMIT BEAMFORMING

(71) Applicant: MARVELL WORLD TRADE LTD., St. Michael (BB)

(72) Inventors: Hongyuan Zhang, Fremont, CA (US); Rohit U. Nabar, Sunnyvale, CA (US); Pen Chung Li, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/249,760

(22) Filed: Apr. 10, 2014

(65) Prior Publication Data

US 2014/0307821 A1    Oct. 16, 2014

Related U.S. Application Data (60) Provisional application No. 61/810,602, filed on Apr. 10, 2013.

(51) Int. Cl.
*H04B 7/02* (2006.01)
*H04L 1/02* (2006.01)
(Continued)

(52) U.S. Cl.
CPC ........ *H04L 25/03904* (2013.01); *H04B 7/0413* (2013.01); *H04B 7/0456* (2013.01); *H04B 7/0626* (2013.01); *H04L 25/0204* (2013.01); *H04L 25/03942* (2013.01)

(58) Field of Classification Search
CPC .................................................... H04B 7/0439
See application file for complete search history.

(56) References Cited

U.S. PATENT DOCUMENTS 6,590,884 B1 * 7/2003 Panasik ......................... 370/338
7,599,332 B2   10/2009 Zelst et al.
(Continued)

FOREIGN PATENT DOCUMENTS

| WO | WO-2009/084904 A2 | 7/2009 |
| WO | WO-2009/152852 A1 | 12/2009 |
| WO | WO-2013/001968 A1 | 1/2013 |

OTHER PUBLICATIONS

International Search Report and Written Opinion for corresponding PCT Application No. PCT/US2014/033632, 11 pages (Aug. 11, 2014).

(Continued)

*Primary Examiner* — Sam K Ahn
*Assistant Examiner* — Fabricio R Murillo Garcia (57) ABSTRACT

In a method for reducing interference in wireless communications, a beamforming matrix is determined at a first communication device based on an estimate of a multiple input, multiple output (MIMO) communication channel between the first communication device and a second communication device. Both the first communication device and the second communication device belong to a first wireless network. Alternatively, the beamforming matrix may be generated based on the estimate of the MIMO communication channel and received at the first communication device. The beamforming matrix is used at the first communication device for the purpose of reducing interference to a second wireless network. where the interference is caused by the first communication device transmitting to the second communication device via the MIMO communication channel.

29 Claims, 7 Drawing Sheets

(51) Int. Cl.
  *H04L 25/03* (2006.01)
  *H04L 25/02* (2006.01)
  *H04B 7/04* (2006.01)
  *H04B 7/06* (2006.01)

(56) References Cited

U.S. PATENT DOCUMENTS

| | | | |
|---|---|---|---|
| 7,742,390 B2 | 6/2010 | Mujtaba | |
| 8,270,909 B2 | 9/2012 | Zhang et al. | |
| 8,526,351 B2 | 9/2013 | Fischer et al. | |
| 8,619,907 B2 | 12/2013 | Mujtaba et al. | |
| 2006/0067426 A1 | 3/2006 | Maltsev et al. | |
| 2007/0232235 A1* | 10/2007 | Li et al. | 455/63.1 |
| 2008/0240208 A1* | 10/2008 | Lou et al. | 375/211 |
| 2009/0080579 A1 | 3/2009 | Fuji | |
| 2009/0196163 A1 | 8/2009 | Du | |
| 2010/0091675 A1 | 4/2010 | Sawai | |
| 2011/0002219 A1 | 1/2011 | Kim et al. | |
| 2011/0223867 A1 | 9/2011 | Chae et al. | |
| 2011/0268217 A1* | 11/2011 | Gormley | H04W 72/04 375/295 |
| 2011/0305156 A1 | 12/2011 | Liu et al. | |
| 2012/0034874 A1* | 2/2012 | Yiu | H04B 7/086 455/63.1 |
| 2012/0039196 A1 | 2/2012 | Zhang | |
| 2012/0087265 A1 | 4/2012 | Tamaki et al. | |
| 2014/0241240 A1* | 8/2014 | Kloper et al. | 370/328 |
| 2014/0302884 A1 | 10/2014 | Zhao et al. | |
| 2014/0334473 A1 | 11/2014 | Zhang et al. | |

OTHER PUBLICATIONS

International Search Report and Written Opinion for corresponding PCT Application No. PCT/US2014/047809, 10 pages (Oct. 22, 2014).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11h™-2003, "IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe," *The Institute of Electrical and Electronics Engineers, Inc.*, Oct. 14, 2003; 75 pages.

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

van Nee, et al. "The 802.11n MIMO-OFDM Standard for Wireless LAN and Beyond," Wireless Personal Communications, vol. 37, pp. 445-453 (Jun. 2006).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, (Mar. 29, 2012).

S. Catreux, et al. "Attainable Throughput of an Interference-Limited Multiple-Input Multiple-Output (MIMO) Cellular System," *IEEE Trans. Communications*, vol. 49, No. 8, pp. 479-493, Aug. 2001.

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

Ansari et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).

Chen, "Home Network Basis: Transmission Environments and Wired/Wireless Protocols," *Prentice Hall*, pp. 1-26 (Jul. 2003).

Hiertz et al., "The IEEE 802.11 Universe," *IEEE Communications Magazine*, pp. 62-70, (Jan. 2010).

Love et al., "An Overview of Limited Feedback in Wireless Communication Systems," IEEE J. on Selected Areas in Communications, vo. 26, No. 8, pp. 1341-1365 (Oct. 2008).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Zhang et al., "Beamforming Feedback for Single Stream," *The Institute of Electrical and Electronics Engineers*, doc. No. IEEE 802.11-12/1312r0, pp. 1-22 (Nov. 12, 2012).

International Preliminary Report on Patentability in International Application No. PCT/US2014/033632, dated Oct. 22, 2015 (8 pages).

Office Action in U.S. Appl. No. 14/338,914, dated Nov. 18, 2015 (22 pages).

International Preliminary Report on Patentability in International Application No. PCT/US2014/047809, dated Feb. 4, 2016 (8 pages).

\* cited by examiner

METHOD AND APPARATUS FOR MITIGATING INTERFERENCE IN A WIRELESS NETWORK THROUGH USE OF TRANSMIT BEAMFORMING

CROSS-REFERENCES TO RELATED APPLICATION

The present application claims the benefit of U.S. Provisional Patent Application No. 61/810,602, entitled "Interference Mitigation by TxBF," filed on Apr. 10, 2013, which is incorporated herein by reference in its entirety.

FIELD OF TECHNOLOGY

The present disclosure relates generally to communication systems and, more particularly, to reducing co-channel interference in wireless networks.

BACKGROUND

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In one embodiment, a method for reducing interference in wireless communications comprises at least one of i) determining, at a first communication device, a beamforming matrix based on an estimate of a multiple input, multiple output (MIMO) communication channel between the first communication device and a second communication device, wherein the first communication device and the second communication device belong to a first wireless network or ii) receiving, at the first communication device, the beamforming matrix, the beamforming matrix having been generated based on the estimate of the MIMO communication channel. The method further comprises using the beamforming matrix at the first communication device for the purpose of reducing interference to a second wireless network caused by the first communication device transmitting to the second communication device via the MIMO communication channel, wherein the second wireless network omits the first communication device.

In another embodiment, an apparatus corresponding to a first communication device comprises a network interface including i) a media access control (MAC) processing unit, and ii) a physical layer (PHY) processing unit coupled to the MAC processing unit. The PHY processing unit is configured to at least one of i) determine a beamforming matrix based on an estimate of a multiple input, multiple output (MIMO) communication channel between the first communication device and a second communication device, wherein the first communication device and the second communication device belong to a first wireless network, or ii) receive the beamforming matrix, the beamforming matrix having been generated based on the estimate of the MIMO communication channel. Moreover, the network interface is configured to use the beamforming matrix for the purpose of reducing interference to a second wireless network caused by the first communication device transmitting to the second communication device via the MIMO communication channel, wherein the second wireless network omits the first communication device.

In yet another embodiment, a method for reducing interference in wireless communications comprises selecting, at a first communication device, a beamforming matrix. The first communication device belongs to a first wireless network, and the first communication device communicates with one or more second communication devices in the first wireless network via a communication channel below 6 GHz. The method further comprises using the beamforming matrix at the first communication device for the purpose of reducing interference to a second wireless network caused by the first communication device transmitting to the one or more second communication devices via the communication channel, wherein the second wireless network omits the first communication device.

In another embodiment, an apparatus corresponding to a first communication device comprises a network interface including i) a media access control (MAC) processing unit, and ii) a physical layer (PHY) processing unit coupled to the MAC processing unit. The first communication device belongs to a first wireless network, and the first communication device communicates with one or more second communication devices in the first wireless network via a communication channel below 6 GHz. Moreover, the network interface is configured to select a beamforming matrix and use the beamforming matrix at the first communication device for the purpose of reducing interference to a second wireless network caused by the first communication device transmitting to the one or more second communication devices via the MIMO communication channel. The second wireless network omits the first communication device.

Various embodiments may provide one or more of the following advantages. In some scenarios and/or embodiments, for example, co-channel interference (CCI) caused by densely deployed WLAN systems or overlapping base service stations is reduced. In some scenarios and/or embodiments, a signal to interference plus noise ratio (SINR) clients and/or each access points (APs) is improved.

DETAILED DESCRIPTION

In various embodiments described below, a first communication device (e.g., an access point) in a first wireless network uses a transmit beamforming matrix for the purpose of reducing interference to a second wireless network, the interference to the second wireless network caused by the first communication device transmitting to one or more second communication devices (e.g., clients) in the first wireless network.

Figure 1:
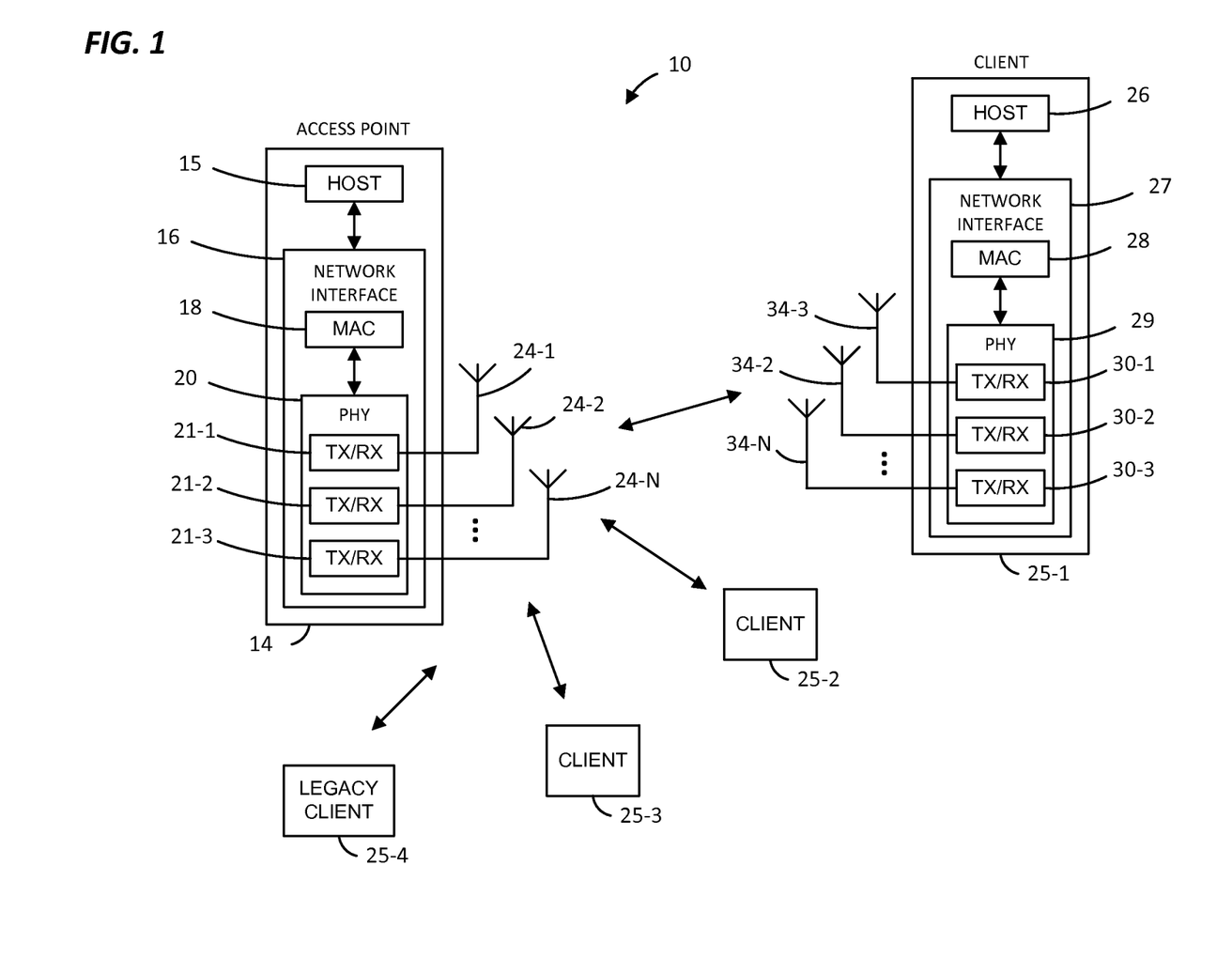
FIG. 1 is a block diagram of an example wireless local area network (WLAN) communication system in which an access point (AP) uses interference mitigation techniques such as described herein, according to an embodiment.

FIG. 1 is a block diagram of an example WLAN 10 in which devices such as an AP 14 and client devices 25 exchange information using OFDM (Orthogonal Frequency-Division Multiplexing) techniques in a multiple input, multiple output (MIMO) mode, according to an embodiment. The AP 14 includes a host processor 15 coupled to a network interface 16. The network interface 16 includes a medium access control (MAC) processing unit 18 and a physical layer processing unit 20. The PHY processing unit 20 includes a plurality of transceivers 21, and the transceivers are coupled to N antennas 24, where N is a suitable positive integer. In FIG. 1, the AP has the same number of transceivers 21 as antennas 24, but in other embodiments, the AP 14 includes different a different number of transceivers 21 than antennas 24 (e.g., there a more antennas than transceivers and antenna switching techniques are utilized). In FIG. 1, three transceivers 21 and three antennas 24 are illustrated, but in other embodiments, the AP 14 includes different suitable numbers of transceivers 21 and antennas 24. (e.g., 1, 2, 4, 5, 6, 8, etc.). In one embodiment, the MAC processing unit 18 and the PHY processing unit 20 are configured to operate according to a communication protocol generally similar to the IEEE 802.11n Standard and/or the IEEE 802.11ac Standard (e.g., a communication protocol that supports beamforming ("a beamforming protocol")), for example.

The network interface device 16 (e.g., the MAC processing unit 18 and/or the PHY processing unit 20) is configured to perform beamforming training procedures with client devices 25, in some embodiments. For example, the network interface device 16 is configured to transmit beamforming training signals to the client device 25 and, in response, receive beamforming feedback from the client device 25, in some embodiments. For example, the beamforming feedback includes a forward channel estimate, and the network interface device 16 (e.g., the PHY processing unit 20) is configured to determine a transmit beamforming matrix based on the forward channel estimate, in an embodiment. As another example, the beamforming feedback includes an indication of the transmit beamforming matrix (e.g., the transmit beamforming matrix, a compressed form of the transmit beamforming matrix, an index to be used for looking up the transmit beamforming matrix in a table, etc.), and the network interface device 16 (e.g., the PHY processing unit 20) is configured to determine the transmit beamforming matrix based on the indication, in an embodiment.

In some embodiments, the network interface device 16 (e.g., the MAC processing unit 18 and/or the PHY processing unit 20) is configured to perform implicit beamforming training procedures with a client device 25 in order to determine a transmit beamforming matrix. For example, in some embodiments, the network interface device 16 (e.g., the PHY processing unit 20) is configured to receiving beamforming training signals from the client device 25 and to determine an estimate of a reverse channel based on the received beamforming training signals. The network interface device 16 (e.g., the PHY processing unit 20) is configured to determine, based on the determined estimate of the reverse channel, a transmit beamforming matrix for use in transmitting to the client device 25.

In some embodiments, the network interface device 16 (e.g., the PHY processing unit 20) includes a memory to store a plurality of pre-generated beamforming matrices. For example, in an embodiment, the plurality of pre-generated beamforming matrices includes respective beamforming matrices corresponding to respective beamforming sectors. In some embodiments, the network interface device 16 (e.g., the PHY processing unit 20) is configured to select a beamforming matrix from the plurality of pre-generated beamforming matrices, and then use the selected beamforming matrix.

A client device 25-1 includes a host processor 26 coupled to a network interface 27. The network interface 27 includes a MAC processing unit 28 and a PHY processing unit 29. The PHY processing unit 29 includes a plurality of transceivers 30, and the transceivers are coupled to a plurality of antennas 34. Although the same number of transceivers 30 and antennas 34 are illustrated in FIG. 1, the client device 25-1 includes different numbers of transceivers 30 and antennas 34, in other embodiments. Although three transceivers 30 and three antennas 34 are illustrated in FIG. 1, the client device 25-1 includes different suitable numbers (e.g., 1, 2, 4, 5, etc.) of transceivers 30 and antennas 34 in other embodiments. The transceiver(s) 30 is/are configured to transmit generated data streams via the antenna(s) 34. Similarly, the transceiver(s) 30 is/are configured to receive data streams via the antenna(s) 34.

The network interface device 27 (e.g., the MAC processing unit 28 and/or the PHY processing unit 29) is configured to perform beamforming training procedures with the AP 14, in some embodiments. For example, the network interface device 27 is configured to receive beamforming training signals from the AP 14 and, in response, generate beamforming feedback and transmit the beamforming feedback to the AP 14, in some embodiments. For example, the network interface device 27 (e.g., the PHY processing unit 29) is configured to determine forward channel estimate based on the received training signals, in an embodiment. The network interface device 27 (e.g., the PHY processing unit 29) is configured to transmit an indication of the forward channel estimate (e.g., the forward channel estimate or a compressed form of the forward channel estimate) to the AP 14, in an embodiment.

In some embodiments, the network interface device 27 (e.g., the PHY processing unit 29) is configured to determine, based on the forward channel estimate, a transmit beamforming matrix to be used by the AP 14. The network interface device 27 (e.g., the PHY processing unit 29) is configured to transmit beamforming feedback to the AP 14 that includes an indication of the determined transmit beamforming matrix (e.g., the transmit beamforming matrix, a compressed form of the transmit beamforming matrix, an index to be used for looking up the transmit beamforming matrix in a table, etc.), in an embodiment.

In some embodiments, the network interface device 27 (e.g., the PHY processing unit 29) is configured to transmit to the AP 14 beamforming training signals as part of an implicit beamforming training procedure.

In an embodiment, one or both of the client devices 25-2 and 25-3 have a structure the same as or similar to the client device 25-1. In these embodiments, the client devices 25 structured like the client device 25-1 have the same or a different number of transceivers and antennas. For example, the client device 25-2 has only two transceivers and two antennas, according to an embodiment.

In an embodiment, the PHY processing unit 20 and the PHY processing unit 29 are configured to utilize interference mitigation techniques in conjunction with utilizing MIMO communication channels below 6 GHz. In an embodiment, the PHY processing unit 20 and the PHY processing unit 29 are configured to utilize interference mitigation techniques in conjunction with utilizing MIMO communication channels between 2 GHz and 6 GHz.

Figure 2A:
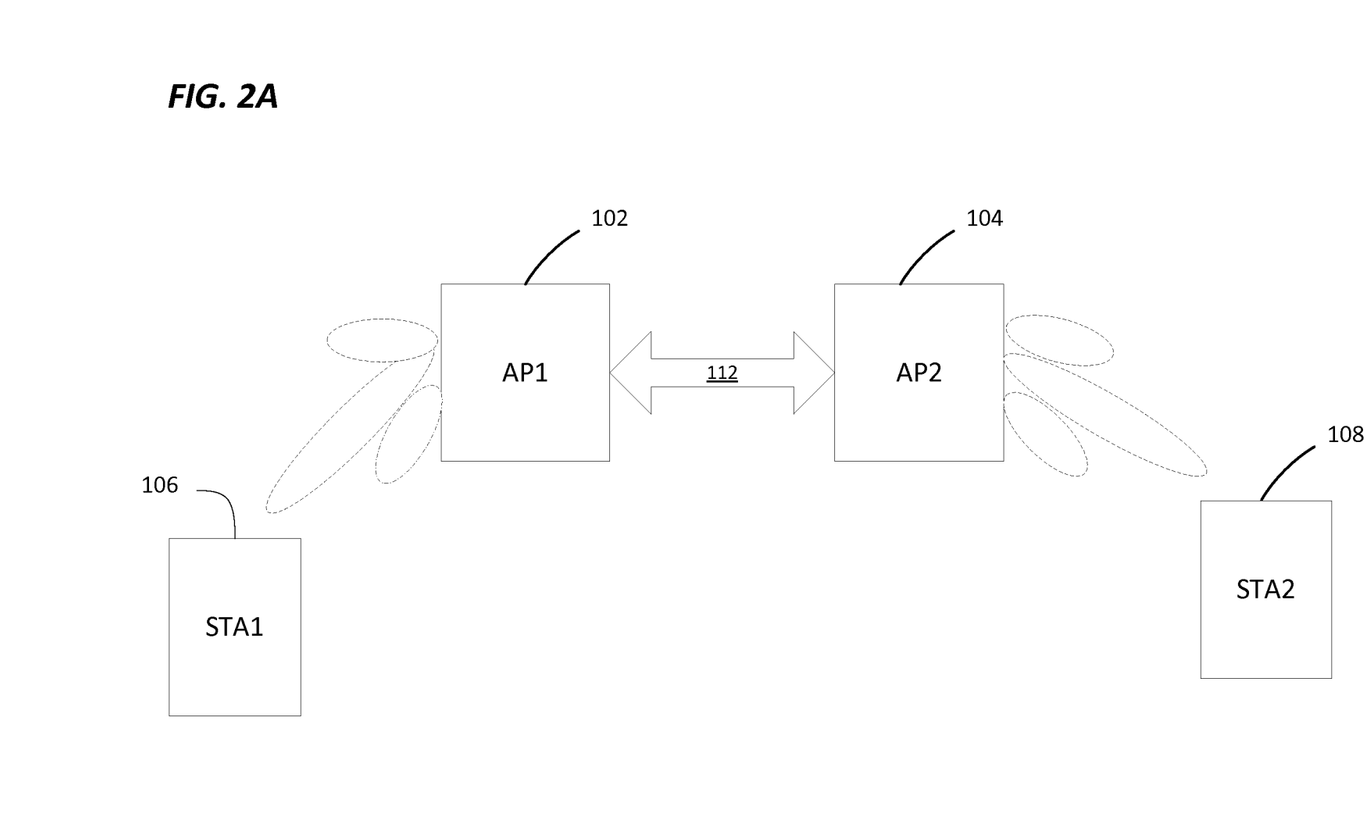
FIG. 2A is a block diagram of an example communication system in which a plurality of APs have overlapping service areas and use beamforming to mitigate interference, according to an embodiment.

FIG. 2A is a block diagram of an environment in which multiple APs are operating, each AP corresponding to a different WLAN, according to an embodiment. In the example of FIG. 2A, two APs 102, 104 have overlapping respective service areas. In an embodiment, AP1 102 has a structure the same or similar to the AP 14 (FIG. 1), and AP2 104 has a structure the same or similar to the AP 14 (FIG. 1).

To reduce interference with the second wireless network associated with AP2 104, AP1 102 performs beamforming, using a beamforming matrix, when transmitting data streams to a client device 106 in the first wireless network. The beamforming matrix may be determined based on measuring the channel between AP1 102 and the client device 106.

With reference to FIGS. 1 and 2A, the PHY processing unit 29 of the client device 106 performs channel measurements, based on training signals received from the AP 14, to generate a channel estimate represented by a matrix H. The channel matrix H is generally is of dimension $N_R \times N_{TX}$, where $N_{TX}$ is the number of transmit antennae at AP1 102 and $N_R$ is the number of receive antennae at the client device 106. The channel estimate H is an estimate of a forward channel from the AP1 102 to the client 106.

In an embodiment, the client device 106 then transmits the channel estimate (e.g., the matrix H or a compressed form of H) to the PHY processing unit 20 of AP1102, and as a result AP1 102 generates a beamforming matrix Q based on the channel estimate. The beamforming matrix Q is generally of dimension $N_{TX} \times N_{SS}$, where $N_{TX}$ is the number of transmit antennae at AP1 102 and $N_{SS}$ is the number of spatial streams that AP1 102 uses for transmission to the client device 106. Alternatively, the client device 106 may generate a beamforming matrix based on the channel estimate and transmit an indication of the beamforming matrix Q (e.g., the matrix Q, a compressed form of Q, an index to permit looking up Q in a table, etc.) to AP1 102.

In other embodiments and/or scenarios, knowledge of the forward channel is determined by AP1 102 using knowledge of a reverse channel from the client device 106 to the AP1 102. Obtaining knowledge of the reverse channel includes the AP1 102 receiving known training signals from the client device 106. The AP1 102 then generates a measurement or estimate of the reverse channel based on the received training signals. The AP1 102 then utilizes the reverse channel estimate to determine an estimate of the forward channel using a suitable technique. The AP1 102 next generates the transmit beamforming matrix using the forward channel estimate as described above. In some embodiments, the transmit beamforming matrix may be generated from the estimate of the reverse channel without first using the estimate of the reverse channel to calculate an estimate of the forward channel.

According to an embodiment in which orthogonal frequency division multiplexing (OFDM) is utilized, N channel estimate matrices are generated for the multiple OFDM tones utilized for transmission. In some embodiments and/or scenarios, N does not correspond to the total number of OFDM tones, but corresponds to a subset of the total number of OFDM tones.

In other embodiments, the beamforming matrix Q is not generated based on a measurement of the channel, but is instead a pre-generated beamforming matrix stored in a memory. As discussed above, a plurality of pre-generated matrices may be stored in the memory, and the AP1 102 may select the beamforming matrix Q from the plurality of pre-generated matrices.

In any event, once the beamforming matrix Q is generated or selected, AP1 102 transmits data to the client device 106 utilizing the beamforming matrix Q for the purpose of reducing interference caused by AP1 102 transmitting the data to the client device 106, in an embodiment. In some scenarios, the AP1 102 using the beamforming matrix Q results in reducing interference, by the AP1 102, to communications in the second wireless network, e.g., communications between the AP2 104 and the client device 108.

In an embodiment, AP2 104 also similarly uses a beamforming matrix determined based on a channel estimate of a communication channel between AP2 104 and client device 108, or uses a selected, pre-generated beamforming matrix, for the purpose of reducing interference caused by AP2 104 transmitting the data to the client device 108, in an embodiment. In some scenarios, the AP2 104 similarly using a beamforming matrix Q results in reducing interference, by the AP2 104, to communications in the first wireless network, e.g., communications between the AP1 102 and the client device 106.

In some embodiments, AP1 102 and AP2 104 are communicatively coupled via a communication link 112 separate from the first wireless network and the second wireless network. In some embodiments, AP1 102 and AP2 104 coordinate transmit beamforming for the purpose of mitigating interference to the second wireless network caused by AP1 102 transmitting in the first wireless network, and/or interference to the first wireless network caused by AP2 104 transmitting in the second wireless network.

In some embodiments, an AP, such as AP1 102 and/or AP2 104, does not need to recognize that other APs are within an overlapping service area before performing beamforming. Instead, in an embodiment, beamforming is performed regardless to reduce the likelihood of interference with any APs that may transmit signals in an overlapping service area.

In other embodiments, AP1 102 communicates with AP2 104 to determine whether interference mitigation techniques, such as described herein, should be utilized. In an embodiment, AP1 102 and AP2 104 perform transmit beamforming when transmitting to intended client devices so that both AP1 102 and AP2 104 reduce interference with the other wireless network.

Further, according to one embodiment, AP1 102 selects a transmit opportunity period for transmitting first data to one or more intended client devices 106. AP1 102 communicates the transmit opportunity period to AP2 104 so that AP2 104 transmits second data to its intended client devices 108 during a time period that coincides with the transmit opportunity period communicated by AP1 102. For example, AP1 102 may designate times $t_1$, $t_4$, $t_7$, $t_{10}$, etc., as transmit opportunity periods, and AP2 104 also transmits to client devices 108 at times $t_1$, $t_4$, $t_7$, $t_{10}$, etc. In an embodiment, AP1 102 and AP2 104 also coordinate uplink time slots (e.g., uplink time slots are scheduled to occur alternatively between the first wireless network and the second wireless network) so that AP1 102 and AP2 104 receive signals from their respective intended client devices at different times to avoid collisions. For example, AP1 102 and AP2 104 may agree that times $t_2$, $t_5$, $t_8$, etc., are designated as uplink time slots for AP1 102 to receive signals from client devices 106, and that e times $t_3$, $t_6$, $t_9$, etc., are designated as uplink time slots for AP2 104 to receive signals from client devices 108. In some embodiments, during designated uplink time slots for AP2 104, AP1 102 may go to sleep (e.g., enter a power save mode) to conserve power.

Figure 2B:
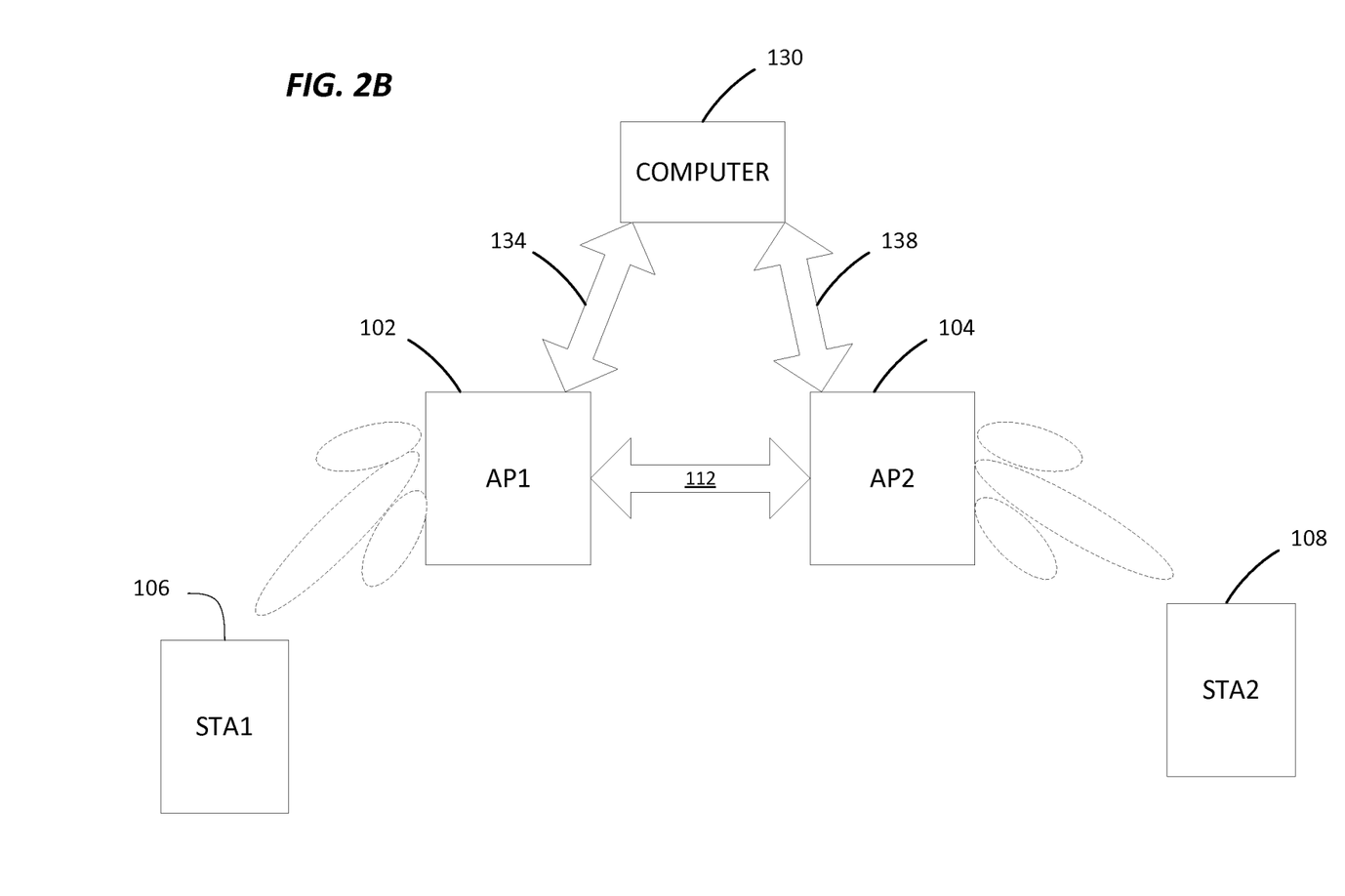
FIG. 2B is a block diagram of another example communication system in which a host coordinates a plurality of APs to mitigate interference, according to an embodiment.

In another embodiment, a computer (e.g., a communication device) separate from AP1 102 and AP2 104 coordinates transmit beamforming for the purpose of mitigating interference to the second wireless network caused by AP1 102 transmitting in the first wireless network, and/or interference to the first wireless network caused by AP2 104 transmitting in the second wireless network. Turning now to FIG. 2B, in an embodiment, a computer 130 is communicatively coupled to AP1 102 via a communication link 134 separate from the first wireless network and the second wireless network. Additionally, the host computer 130 is communicatively coupled to AP2 104 via a communication link 138 separate from the first wireless network and the second wireless network. The computer 130 coordinates transmit beamforming for the purpose of mitigating interference to the second wireless network caused by AP1 102 transmitting in the first wireless network, and/or interference to the first wireless network caused by AP2 104 transmitting in the second wireless network.

While two APs 102 and 104 and one client device corresponding to each AP are illustrated in FIGS. 2A and 2B, other embodiments may include different suitable numbers (e.g., 3, 4, 5, 6, etc.) of APs and different suitable numbers (e.g., 2, 3, 4, 5, 6, etc.) of client devices corresponding to each AP. In these embodiments, one or several APs may participate in coordinating beamforming for the plurality of APs.

Additionally, while one computer 130 (e.g., a communication device) is illustrated in FIG. 2B, any suitable number of computer may be used to coordinate beamforming for multiple APs.

In some embodiments, interference mitigation techniques such as described above are utilized in conjunction with an AP transmitting unicast and/or multicast packets, and single-user and/or multi-user transmissions.

Figure 3A:
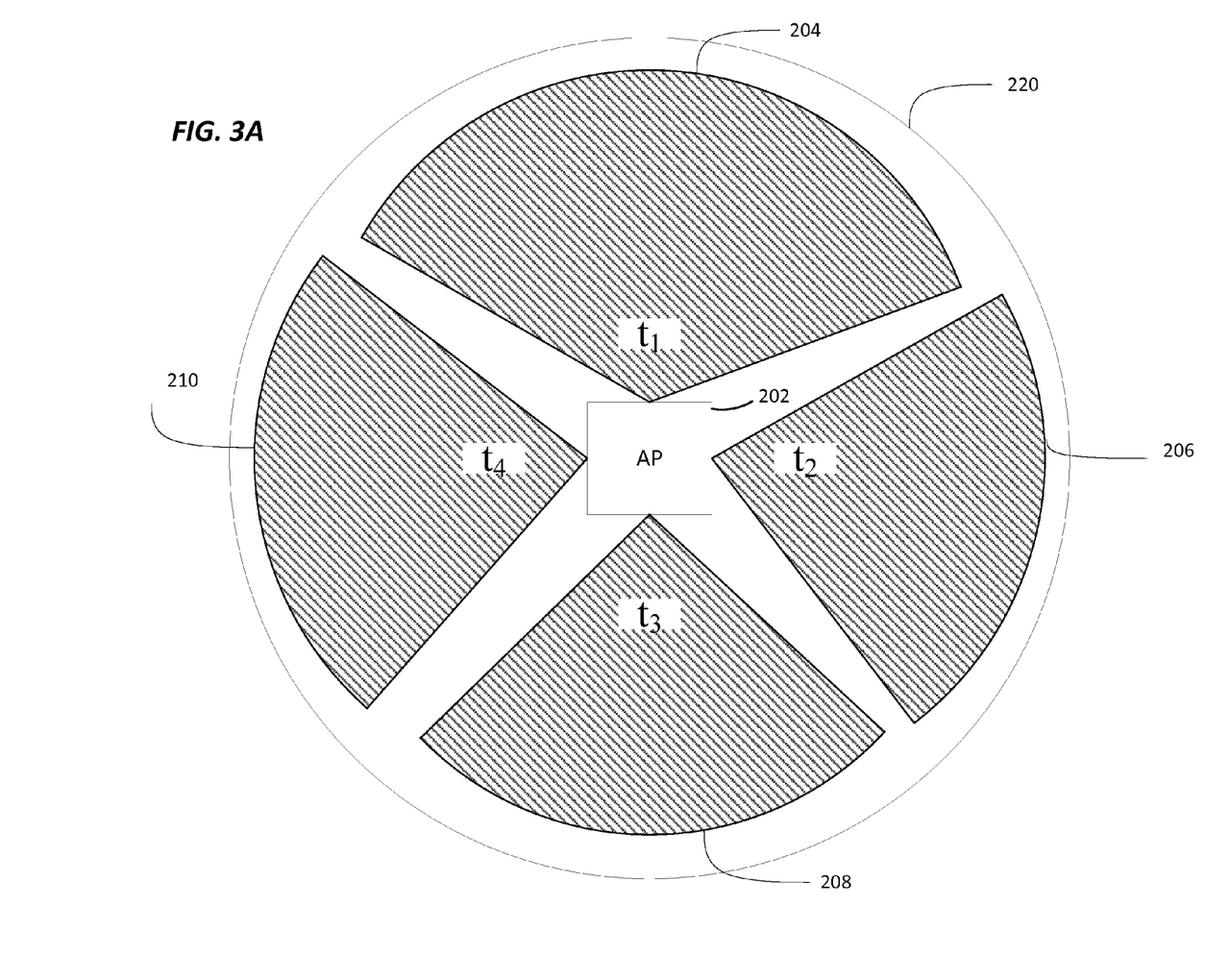
FIG. 3A is a diagram of a service area of an example AP in which the AP transmits in sectors using beamforming matrices, according to an embodiment.

FIG. 3A is a diagram of an example AP 202 according to an embodiment. AP 202, which has a structure the same or similar to the AP 14 of FIG. 1, is configured to use pre-generated beamforming matrices to transmit to different sectors within a service area 220. In particular, AP 202 is configured to use a respective pre-generated beamforming matrix to transmit to one of sectors 204, 206, 208, and 210 that generally cover the service area 220. For example, in one embodiment, AP 202 retrieves a first beamforming matrix when AP 202 is to transmit to sector 204, and then utilizes the first beamforming matrix to transmit to sector 204; AP 202 retrieves a second beamforming matrix when AP 202 is to transmit to sector 206, and then utilizes the second beamforming matrix to transmit to sector 206; AP 202 retrieves a third beamforming matrix when AP 202 is to transmit to sector 208, and then utilizes the third beamforming matrix to transmit to sector 208; and AP 202 retrieves a fourth beamforming matrix when AP 202 is to transmit to sector 210, and then utilizes the fourth beamforming matrix to transmit to sector 210. In some embodiments, the preloaded beamforming matrix is calibrated by measuring the channel quality at two receivers (receiver 1 and receiver 2, not shown) in different sectors. For example, receiver 1 is placed in sector 204 while receiver 2 is placed in sector 206. The AP 202 then transmits training signals using the first beamforming matrix designed to direct the training signals to sector 204. Both receiver 1 and receiver 2 measure the signal quality of the received signals, by for example measuring corresponding received signal strength indicators (RSSIs). The first beamforming matrix is then adjusted until the RSSI is maximized at sector 204 and minimized at sector 206, in an embodiment. For example, the first beamforming matrix may be adjusted until the RSSI exceeds a first predetermined threshold in the desired direction and the RSSI drops below a second predetermined threshold in the undesired direction. The adjusted beamforming matrix is then stored for future use when transmitting to sector 204 is desired. Beamforming matrices corresponding to the other sectors may be similarly adjusted, in an embodiment.

In an embodiment, the AP 202 transmits broadcast packets to one sector of service area 220 at a time, transmitting the broadcast packets to the whole service area after several time intervals. For example, the AP 202 selects a transmit opportunity period, $t_1$, to transmit broadcast packets to sector 204. At time $t_1$, the AP 202 utilizes the first beamforming matrix to transmit the broadcast packet to sector 204. Moreover, the AP 202 selects a different transmit opportunity period, $t_2$, to transmit the broadcast packet to sector 206. At time $t_2$, the AP 202 utilizes the second beamforming matrix to transmit the broadcast packet to sector 206. The AP 202 may then continue to transmit the broadcast packet in this manner until the broadcast packet has been transmitted to the whole service area. While four sectors are illustrated in FIG. 3A, and thus it would take four time intervals to transmit data streams to the whole service area 220, a service area may be divided into any suitable number (e.g., two, three, five, six, etc.) of sectors. Therefore, it may take any suitable number of time intervals (e.g., two, three, five, six, etc.) for the AP 202 to transmit data streams to the entire service area 220, one sector at a time.

Figure 3B:
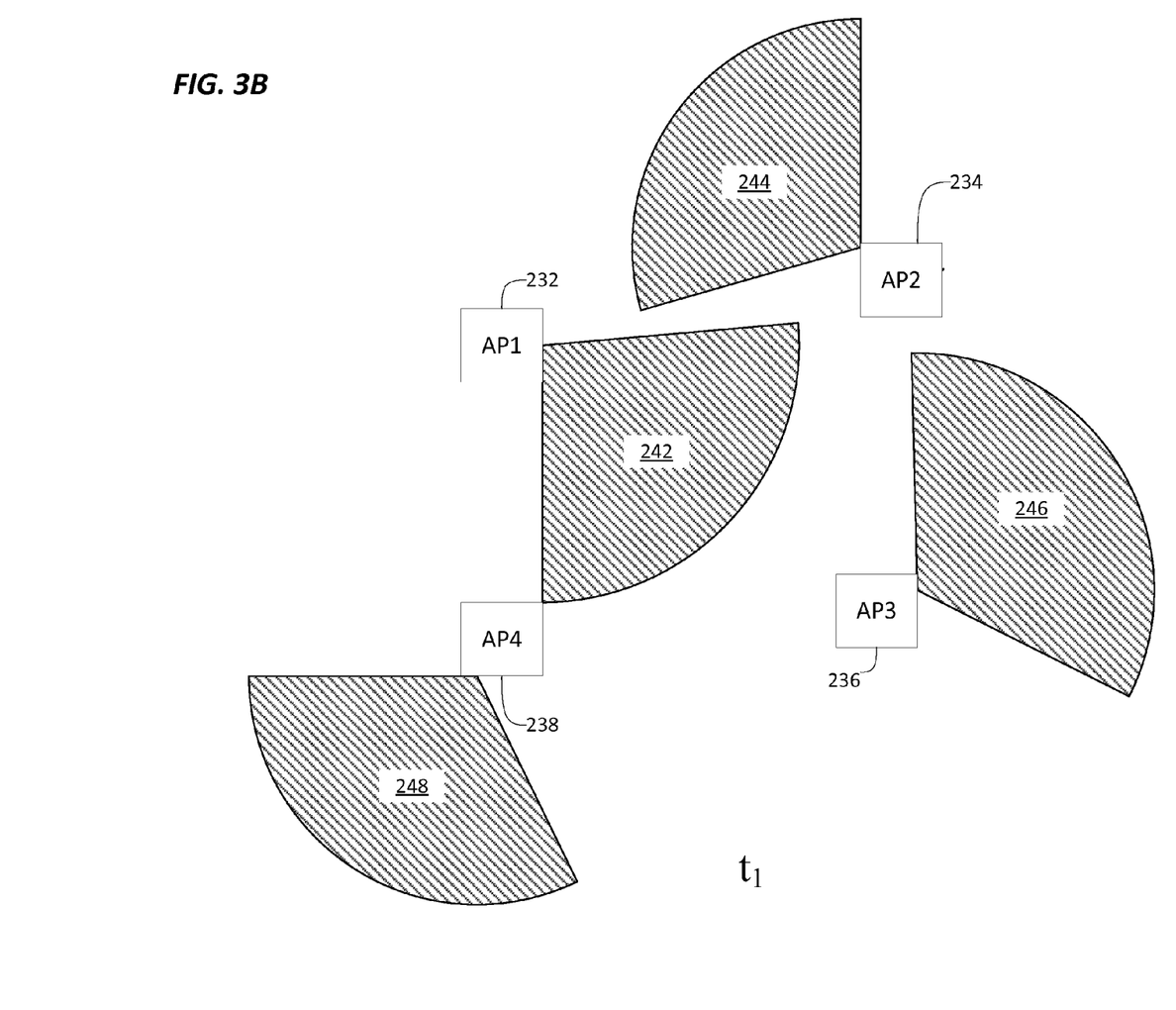
FIG. 3B is a diagram of a plurality of example APs transmitting broadcast packets to different sectors at a time $t_1$ to mitigate interference, according to an embodiment.

Additionally, multiple APs which are broadcasting packets may coordinate with one other (and/or via a computer similar to the system of FIG. 2B) so that the APs broadcasts packets to non-overlapping sectors (or sectors with minimal or reduced overlap. For example, FIG. 3B is a diagram of an example system comprising four APs, AP1232, AP2234, AP3236 and AP4238 260. The four APs coordinate with one another other (and/or via a computer similar to the system of FIG. 2B) to determine when to broadcast in which sectors to minimize interference caused by the broadcasts, in an embodiment.

For example, AP1232 broadcasts in a sector 242 during a time period $t_1$; AP2234 broadcasts in a sector 244 during the time period $t_1$; AP3236 broadcasts in a sector 246 during the time period $t_1$; and AP4238 broadcasts in a sector 248 during the time period $t_1$.

Figure 3C:
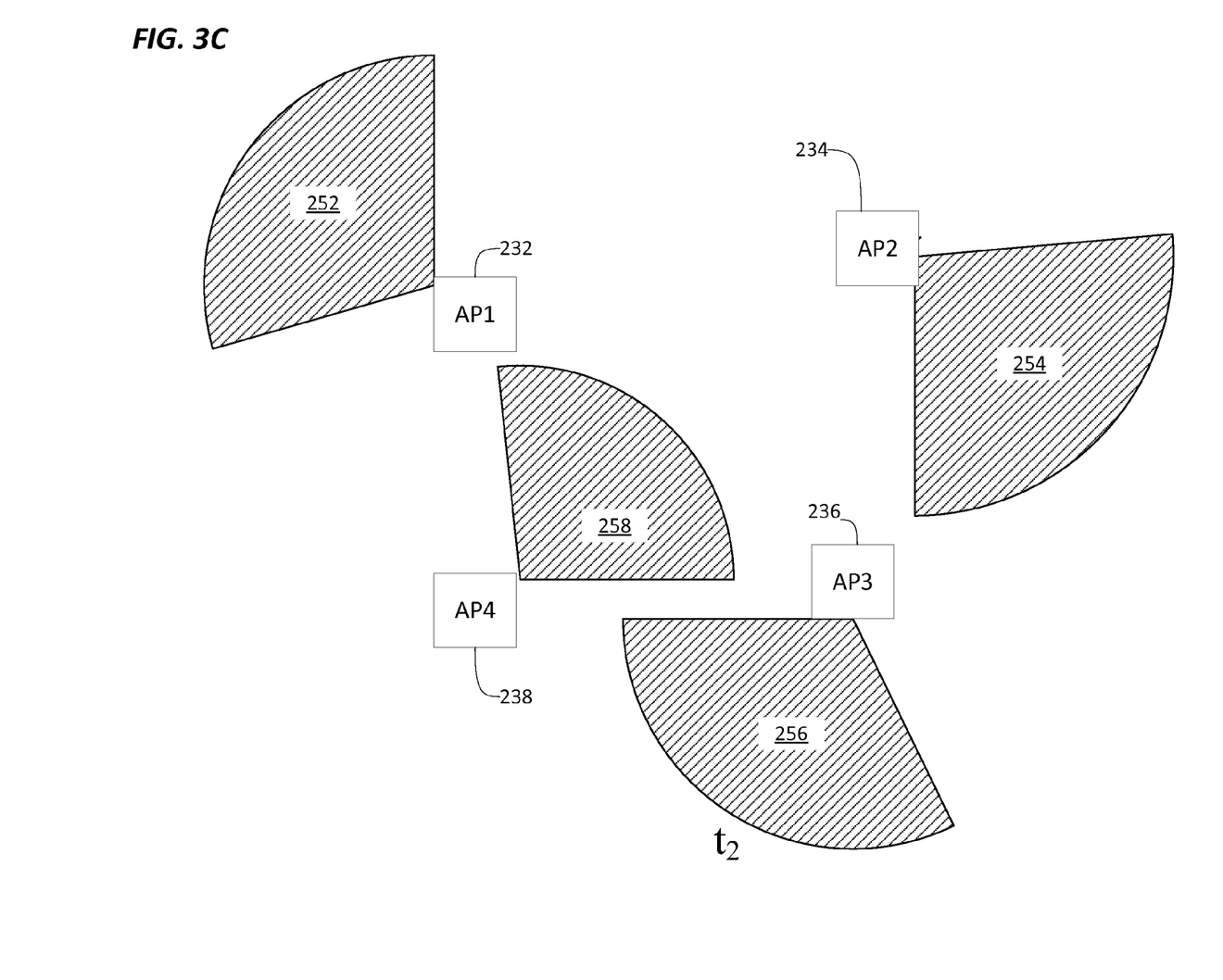
FIG. 3C is a diagram of the plurality of APs of FIG. 3B transmitting the broadcast packets to different sectors at a time $t_2$ to mitigate interference, according to an embodiment.

On the other hand, FIG. 3C is a diagram of the example system of FIG. 3B during a time period $t_2$. AP1232 broadcasts in a sector 252 during the time period $t_2$; AP2234 broadcasts in a sector 254 during the time period $t_2$; AP3236 broadcasts in a sector 256 during the time period $t_2$; and AP4238 broadcasts in a sector 258 during the time period $t_2$.

In an embodiment, the time period $t_1$ and the time period $t_2$ may correspond to different transmit opportunity (TXOP) periods.

In some embodiments, multiple APs may coordinate with one other (and/or via a computer similar to the system of FIG. 2B) so that the APs schedule respective downlink TXOPs to correspond to a same time period and to use beamforming techniques, such as described above, during the TXOPs. Similarly, in some embodiments, multiple APs may coordinate with one other (and/or via a computer similar to the system of FIG. 2B) to schedule respective uplink time slots so that transmissions of respective clients in respective wireless networks have no or reduced collisions. In some of such embodiments, when there are no scheduled uplink transmissions to a particular AP during an uplink time slot, the particular AP optionally may go into a low power mode (e.g., a sleep mode) during the uplink time slot.

In various embodiments, techniques described above can be combined in any suitable combination. As an illustrative example, in an embodiment, a network interface of an AP may be configured to utilize the beamforming techniques described above with respect to FIG. 2A and/or FIG. 2B, for example, when transmitting unicast packets (and/or multicast packets, (and/or single user transmissions and/or multi-user transmissions), and use beamforming techniques described above with respect to FIG. 3A and/or FIG. 3B and/or FIG. 3C, for example, when transmitting broadcast packets.

Figure 4:
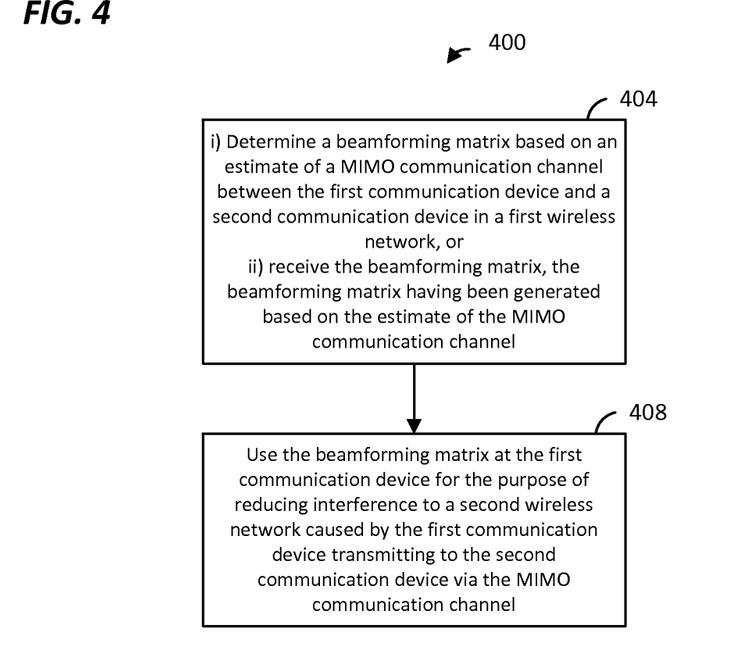
FIG. 4 is a flow diagram of an example method for reducing interference with other wireless network devices, according to an embodiment.

FIG. 4 is a flow diagram of an example method 400 for reducing interference in wireless communications. The method 400 is implemented at a first communication device that belongs to a first wireless network (e.g., a WLAN or another suitable wireless network). The method 400 is implemented by the network interface 16 of access point 14, in an embodiment, and the method 400 is discussed with reference to FIG. 1 for illustrative purposes. In other embodiments, the method 400 is implemented by another suitable communication device, e.g. by a suitable network interface device of the communication device.

At block 404, the first communication device determines a beamforming matrix based on an estimate of a MIMO communication channel between the first communication device and a second communication device in the first wireless network, in an embodiment.

Alternatively at block 404, in another embodiment, the first communication device receives the beamforming matrix, the beamforming matrix having been generated based on the estimate of the MIMO communication channel. For example, as discussed above, the second communication may generate a beamforming matrix for use by the first communication device, and then the second communication device may transmit the beamforming matrix to the first communication device.

In an embodiment, the PHY processing unit 20 is configured to implement block 404.

At block 408, the first communication device uses the beamforming matrix for the purpose of reducing interference to a second wireless network caused by the first communication device transmitting to the second communication device via the MIMO communication channel. For example, in an embodiment, the beamforming matrix comprises gain factors and phase factors, and the first communication device uses the gain factors and phase factors to modify signals to be transmitted prior to the signals being applied to multiple antennas of the first communication device.

In an embodiment, the PHY processing unit 20 is configured to apply the beamforming matrix to signals that will be transmitted via the multiple antennas of the first communication device. In an embodiment, the network interface 16 is configured to implement block 408 (e.g., the PHY processing unit 20 is configured to implement block 408, or the MAC processing unit 18 and the PHY processing unit 20 are configured to jointly implement block 408).

In some embodiments, the MIMO communication channel utilized in conjunction with the method 400 is below 6 GHz. In some embodiments, the MIMO communication channel utilized in conjunction with the method 400 is between 2 GHz and 6 GHz. In some embodiments, the MIMO communication channel utilized in conjunction with the method 400 is below 10 GHz. In some embodiments, the MIMO communication channel utilized in conjunction with the method 400 is between 1 GHz and 10 GHz.

Figure 5:
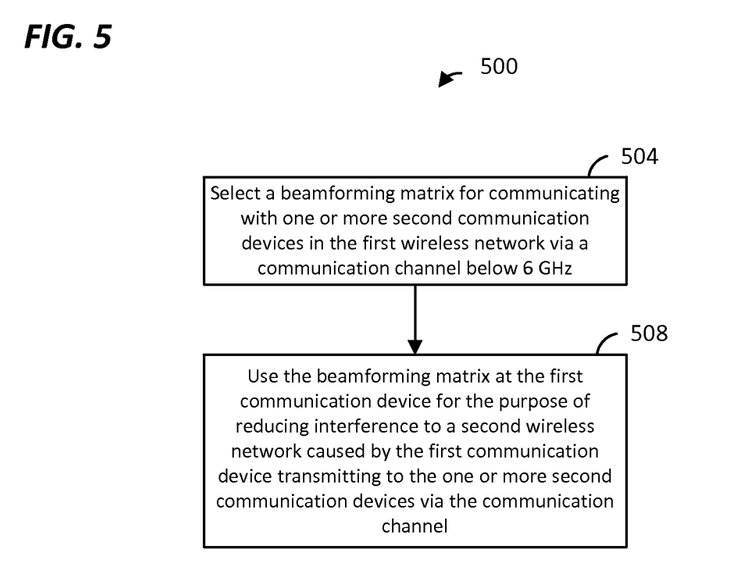
FIG. 5 is a flow diagram of an example method for reducing interference with other wireless network devices, according to an embodiment.

FIG. 5 is a flow diagram of an example method 500 for reducing interference in wireless communications. The method 500 is implemented at a first communication device that belongs to a first wireless network (e.g., a WLAN or another suitable wireless network). The method 500 is implemented by the network interface 16 of access point 14, in an embodiment, and the method 500 is discussed with reference to FIG. 1 for illustrative purposes. In other embodiments, the method 500 is implemented by another suitable communication device, e.g. by a suitable network interface device of the communication device.

At block 504, the first communication device selects a beamforming matrix for communicating with one or more second communication devices in the first wireless network via a communication channel below 6 GHz. In some embodiments, the communication channel is between 2 GHz and 6 GHz. In other embodiments, the communication channel is between 1 GHz and 10 GHz.

In some embodiments, the beamforming matrix is selected from a plurality of pre-generated beamforming matrices using techniques such as described above. In an embodiment, the plurality of pre-generated beamforming matrices includes multiple beamforming matrices corresponding to different sectors.

In an embodiment, the PHY processing unit 20 is configured to implement block 504.

At block 508, the first communication device uses the beamforming matrix for the purpose of reducing interference to a second wireless network caused by the first communication device transmitting to the one or more second communication devices via the communication channel. For example, in an embodiment, the beamforming matrix comprises gain factors and phase factors, and the first communication device uses the gain factors and phase factors to modify signals to be transmitted prior to the signals being applied to multiple antennas of the first communication device.

In an embodiment, the PHY processing unit 20 is configured to apply the beamforming matrix to signals that will be transmitted via the multiple antennas of the first communication device. In an embodiment, the network interface 16 is configured to implement block 508 (e.g., the PHY processing unit 20 is configured to implement block 508, or the MAC processing unit 18 and the PHY processing unit 20 are configured to jointly implement block 508).

In some embodiments, interference mitigation techniques such as described above are utilized in response to determining that transmissions from the first communication device are causing interference, in an embodiment, or are likely to cause interference, in an embodiment, to the second wireless network. For example, in an embodiment, the first communication device may detect transmissions from the second wireless network, and in response interference mitigation techniques such as described above. For example, it may be assumed that, because the first communication device detected transmissions from the second wireless network, transmissions from the first communication device are likely causing interference to the second wireless network.

As another example, in an embodiment, the first communication device may determine whether transmissions from a second wireless network meet a signal strength criteria (e.g., a measure of signal strength (e.g., power, RSSI, etc.) meets a threshold (e.g., exceeds the threshold, is greater than or equal to the threshold, etc.); and in response to the transmissions from the second wireless network meeting the criteria, interference mitigation techniques such as described above may be utilized. For example, it may be assumed that, because the first communication device detects transmissions from the second wireless network that meet the signal strength criteria, the second wireless network is likely near to the first communication device and transmissions from the first communication device are likely causing interference to the second wireless network.

In some embodiments, interference mitigation techniques such as described above are utilized in response to determining that a communication device (e.g., an AP or a client) in the second wireless network is within a particular distance from the first communication device (e.g., the AP of the first wireless network). For example, in an embodiment, the first communication device may determine a location of a communication device (e.g., an AP or a client) in the second wireless network, and determine whether the location of the communication device in the second wireless network is within a particular distance from the first communication device. For example, in an embodiment, the first communication device (e.g., the AP of the first wireless network) may calculate or estimate a distance between the first communication device and the communication device in the second wireless network, and compare the distance to a threshold. If the distance meets the threshold (e.g., is less than the threshold, less than or equal to the threshold), the first communication device may utilize interference mitigation techniques such as described above. In some embodiments, the first communication device may estimate a distance between the first communication device and the device in the second wireless network based on a measure of signal strength with regard to transmissions from the device in the second wireless network.

In some embodiments, the first communication device utilizes interference mitigation techniques such as described above in response to receiving a communication (e.g., a request for the first communication device to use utilize interference mitigation techniques, a notification that the first communication device is causing interference to the second wireless network, etc.), from a device in the second wireless network. In some embodiments, the communication is received via a communication link different from communication channels used in the first wireless network and the second wireless network.

At least some of the various blocks, operations, and techniques described above may be implemented in hardware, a processor executing firmware and/or software instructions, or any combination thereof.

When implemented utilizing a processor executing software or firmware instructions, the software or firmware instructions may be stored in any non-transitory, tangible computer readable medium or media such as a magnetic disk, an optical disk, a RAM or ROM or flash memory, a memory of a processor, a hard disk drive, an optical disk drive, a tape drive, etc. The software or firmware instructions may include machine readable instructions stored on a memory or other tangible, non-transitory computer-readable storage medium that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

Further aspects of the present invention relates to one or more of the following clauses.

In one embodiment, a method for reducing interference in wireless communications comprises at least one of i) determining, at a first communication device, a beamforming matrix based on an estimate of a multiple input, multiple output (MIMO) communication channel between the first communication device and a second communication device, wherein the first communication device and the second communication device belong to a first wireless network or ii) receiving, at the first communication device, the beamforming matrix, the beamforming matrix having been generated based on the estimate of the MIMO communication channel. The method further comprises using the beamforming matrix at the first communication device for the purpose of reducing interference to a second wireless network caused by the first communication device transmitting to the second communication device via the MIMO communication channel, wherein the second wireless network omits the first communication device.

In other embodiments, the method includes any suitable combination of one or more of the following features.

Determining, at the first communication device, the estimate of the MIMO communication channel.

Determining the estimate of the MIMO communication channel includes receiving the estimate of the MIMO communication channel from the second communication device.

The MIMO communication channel is below 6 GHz and/or the MIMO communication channel is above 2 GHz.

The second wireless network omits the second communication device.

Determining, at the first communication device, that the first communication device transmitting to the second communication device via the MIMO communication channel will cause interference to the second wireless network; wherein using the beamforming matrix at the first communication device for the purpose of reducing interference to the second wireless network is performed in response to determining that the first communication device transmitting to the second communication device via the MIMO communication channel will cause interference to the second wireless network.

In another embodiment, an apparatus corresponding to a first communication device comprises a network interface including i) a media access control (MAC) processing unit, and ii) a physical layer (PHY) processing unit coupled to the MAC processing unit. The PHY processing unit is configured to at least one of i) determine a beamforming matrix based on an estimate of a multiple input, multiple output (MIMO) communication channel between the first communication device and a second communication device, wherein the first communication device and the second communication device belong to a first wireless network, or ii) receive the beamforming matrix, the beamforming matrix having been generated based on the estimate of the MIMO communication channel. Moreover, the network interface is configured to use the beamforming matrix for the purpose of reducing interference to a second wireless network caused by the first communication device transmitting to the second communication device via the MIMO communication channel, wherein the second wireless network omits the first communication device.

In other embodiments, the apparatus includes any suitable combination of one or more of the following features.

The PHY processing unit is configured to determine the estimate of the MIMO communication channel.

The PHY processing unit is configured to determine the estimate of the MIMO communication channel based on receiving the estimate of the MIMO communication channel from the second communication device.

The MIMO communication channel is below 6 GHz and/or the MIMO communication channel is above 2 GHz.

The second wireless network omits the second communication device.

The network interface is further configured to determine that the first communication device transmitting to the second communication device via the MIMO communication channel will cause interference to the second wireless network. To use the beamforming matrix at the first communication device for the purpose of reducing interference to the second wireless network is performed in response to determining that the first communication device transmitting to the second communication device via the MIMO communication channel will cause interference to the second wireless network.

In yet another embodiment, a method for reducing interference in wireless communications comprises selecting, at a first communication device, a beamforming matrix. The first communication device belongs to a first wireless network, and the first communication device communicates with one or more second communication devices in the first wireless network via a communication channel below 6 GHz. The method further comprises using the beamforming matrix at the first communication device for the purpose of reducing interference to a second wireless network caused by the first communication device transmitting to the one or more second communication devices via the communication channel, wherein the second wireless network omits the first communication device.

In other embodiments, the method includes any suitable combination of one or more of the following features.

The first communication is communicatively coupled, via a communication link separate from the first wireless network and the second wireless network, to a third communication device. Selecting the first beamforming matrix from the plurality of pre-generated beamforming matrices is performed in coordination with the third communication device and/or the third communication device belongs to the second wireless network.

The first communication device is a first access point (AP) of the first wireless network, and/or the third communication device is a second AP of the second wireless network.

The first AP coordinates with the second AP so that the first AP uses the first beamforming matrix for a first downlink transmission when the second AP is scheduled to perform a second downlink transmission, and/or the first AP coordinates with the second AP so that the first AP schedules one or more first uplink transmissions in the first wireless network at times different than when the second AP schedules one or more second uplink transmissions in the second wireless network.

Using the beamforming matrix comprises using the beamforming matrix to transmit a broadcast packet from the first communication device to multiple second communications devices.

Selecting the beamforming matrix comprises selecting, at the first communication device, the beamforming matrix from a plurality of pre-generated beamforming matrices.

The beamforming matrix is a first beamforming matrix from the plurality of pre-generated beamforming matrices. Using the first beamforming matrix comprises using the first beamforming matrix at a first time and the method further comprises selecting, at the first communication device, a second beamforming matrix from the plurality of pre-generated beamforming matrices, and using the second beamforming matrix at the first communication device at a second time for the purpose of reducing interference to the second wireless network caused by the first communication device transmitting to the one or more second communications device via the communication channel.

Using the first beamforming matrix at the first time comprises using the first beamforming matrix to transmit a broadcast packet from the first communication device, and using the second beamforming matrix at the second time comprises using the second beamforming matrix to re-transmit the broadcast packet from the first communication device.

The communication channel is above 2 GHz.

In another embodiment, an apparatus corresponding to a first communication device comprises a network interface including i) a media access control (MAC) processing unit, and ii) a physical layer (PHY) processing unit coupled to the MAC processing unit. The first communication device belongs to a first wireless network, and the first communication device communicates with one or more second communication devices in the first wireless network via a communication channel below 6 GHz. Moreover, the network interface is configured to select a beamforming matrix and use the beamforming matrix at the first communication device for the purpose of reducing interference to a second wireless network caused by the first communication device transmitting to the one or more second communication devices via the MIMO communication channel. The second wireless network omits the first communication device.

In other embodiments, the apparatus includes any suitable combination of one or more of the following features.

The first communication is communicatively coupled, via a communication link separate from the first wireless network and the second wireless network, to a third communication device and network interface is configured to select the first beamforming matrix from the plurality of pre-generated beamforming matrices is performed in coordination with the third communication device.

A system comprising the apparatus as mentioned above and the third communication device.

The first communication device is a first access point (AP) of the first wireless network, and the third communication device is communicatively coupled to a second AP of the second wireless network.

The third communication device is configured to: coordinate the first AP and the second AP so that the network interface uses the first beamforming matrix for a first downlink transmission when the second AP is scheduled to perform a second downlink transmission. The third communication device is further configured to: cause the first AP to schedule one or more first uplink transmissions in the first wireless network at times different than when the second AP schedules one or more second uplink transmissions in the second wireless network.

The first communication device is a first access point (AP) of the first wireless network, and the third communication device is a second AP of the second wireless network.

The first AP coordinates with the second AP so that the network interface uses the first beamforming matrix for a first downlink transmission when the second AP is scheduled to perform a second downlink transmission and/or the first AP coordinates with the second AP so that the first AP schedules one or more first uplink transmissions in the first wireless network at times different than when the second AP schedules one or more second uplink transmissions in the second wireless network.

The network interface is configured to use the beamforming matrix to transmit a broadcast packet from the first communication device to multiple second communications devices.

The network interface is configured to select the beamforming matrix from a plurality of pre-generated beamforming matrices.

The beamforming matrix is a first beamforming matrix from the plurality of pre-generated beamforming matrices. The network interface is configured to: use the first beamforming matrix at a first time, select a second beamforming matrix from the plurality of pre-generated beamforming matrices, and use the second beamforming matrix at the first communication device at a second time for the purpose of reducing interference to the second wireless network caused by the first communication device transmitting to the one or more second communications device via the communication channel.

The network interface is configured to: use the first beamforming matrix at the first time to transmit a broadcast packet from the first communication device, and use the second beamforming matrix at the second time to re-transmit the broadcast packet from the first communication device.

The communication channel is above 2 GHz.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for reducing interference in wireless communications, the method comprising:
   at least one of
      i) determining, at a first communication device, a beamforming matrix based on an estimate of a multiple input, multiple output (MIMO) communication channel between the first communication device and a second communication device, wherein the first communication device and the second communication device belong to a first wireless network, wherein the beamforming matrix is determined without using channel estimate information corresponding to a communication channel to any third communication device in a second wireless network, and wherein the second wireless network omits the first communication device, or
      ii) receiving, at the first communication device, the beamforming matrix, the beamforming matrix having been generated a) based on the estimate of the MIMO communication channel and b) without using channel estimate information corresponding to the communication channel to any third communication device in the second wireless network;
   the method further comprising:
      determining, at the first communication device, at least one of i) whether a distance between the first communication device and one of the third communication devices is less than a distance threshold and ii) whether transmissions from the second wireless network meet a signal strength criteria;
      in response to determining at least one of i) that the distance is less than a distance threshold and ii) that the transmissions from the second wireless network meet the signal strength criteria, determining that the first communication device is near to the second wireless network and that transmissions from the first communication device in the first wireless network are producing interference to the second wireless network;
      determining, at the first communication device, whether the first communication device receives from any third communication device in the second wireless network via a communication link a request for the first communication device to reduce interference to the second wireless network, wherein the request is in response to the produced interference to the second wireless network;
      in response to determining that transmissions from the first communication device in the first wireless network are producing interference to the second wireless network, reducing, by using the beamforming matrix at the first communication device, the interference to the second wireless network, wherein the interference is generated by the first communication device transmitting to the second communication device via the MIMO communication channel;
      coordinating, at the first communication device, with an access point in the second wireless network so that the first communication device uses a first beamforming matrix for a first downlink transmission when the access point is scheduled to perform a second downlink transmission to a client communication device in the second wireless network; and
      coordinating, at the first communication device, with the access point in the second wireless network so that the first communication device schedules one or more first uplink transmissions in the first wireless network at times different than when the access point schedules one or more second uplink transmissions in the second wireless network;
   wherein
      the one or more first uplink transmissions are one or more transmissions from the second communication device to the first communication device, and
      the one or more second uplink transmissions are one or more transmissions from the fourth communication device or from one or more other client communication devices in the second wireless network to the access point.

2. The method of claim 1, further comprising determining, at the first communication device, the estimate of the MIMO communication channel.

3. The method of claim 1, wherein determining the estimate of the MIMO communication channel includes receiving the estimate of the MIMO communication channel from the second communication device.

4. The method of claim 1, wherein the MIMO communication channel is below 6 GHz.

5. The method of claim 4, wherein the MIMO communication channel is above 2 GHz.

6. The method of claim 1, wherein the second wireless network omits the second communication device.

7. An apparatus corresponding to a first communication device, the apparatus comprising:
   a network interface including
      i) a media access control (MAC) processing unit, and
      ii) a physical layer (PHY) processing unit coupled to the MAC processing unit;
   wherein the PHY processing unit is configured to at least one of
      i) determine a beamforming matrix based on an estimate of a multiple input, multiple output (MIMO) communication channel between the first communication device and a second communication device, wherein the first communication device and the second communication device belong to a first wireless network, wherein the beamforming matrix is determined without using channel estimate information corresponding to a communication channel to any third communication device in a second wireless network, and wherein the second wireless network omits the first communication device, or ii) receive the beamforming matrix, the beamforming matrix having been generated a) based on the estimate of the MIMO communication channel and b) without using channel estimate information corresponding to the communication channel to any third communication device in the second wireless network; and wherein the network interface is configured to determine at least one of i) whether a distance between the first communication device and one of the third communication devices is less than a distance threshold and ii) whether transmissions from the second wireless network meet a signal strength criteria, in response to a determination of at least one of i) that the distance is less than a distance threshold and ii) that the transmissions from the second wireless network meet the signal strength criteria, determine that the first communication device is near to the second wireless network and that transmissions from the first communication device in the first wireless network are producing interference to the second wireless network, determine whether the first communication device receives from any third communication device in the second wireless network via a communication link a request for the first communication device to reduce interference to the second wireless network, in response to a determination that the request for the first communication device to reduce interference to the second wireless network is received, determine that transmissions from the first communication device in the first wireless network are producing interference to the second wireless network, in response to a determination that transmissions from the first communication device in the first wireless network are producing interference to the second wireless network, reduce, by use of the beamforming matrix, the interference to the second wireless network, wherein the interference is generated by the first communication device transmitting to the second communication device, use the beamforming matrix for the purpose of reducing interference to the second wireless network caused by the first communication device transmitting to the second communication device via the MIMO communication channel, coordinate with an access point in the second wireless network so that the first communication device uses a first beamforming matrix for a first downlink transmission when the access point is scheduled to perform a second downlink transmission to a client communication device in the second wireless network, and coordinate with the access point in the second wireless network so that the first communication device schedules one or more first uplink transmissions in the first wireless network at times different than when the access point schedules one or more second uplink transmissions in the second wireless network;

wherein the one or more first uplink transmissions are one or more transmissions from the second communication device to the first communication device and the one or more second uplink transmissions are one or more transmissions from the fourth communication device or from one or more other client communication devices in the second wireless network to the access point.

8. The apparatus of claim 7, wherein the PHY processing unit is configured to determine the estimate of the MIMO communication channel.

9. The apparatus of claim 7, wherein the PHY processing unit is configured to determine the estimate of the MIMO communication channel based on receiving the estimate of the MIMO communication channel from the second communication device.

10. The apparatus of claim 7, wherein the MIMO communication channel is below 6 GHz.

11. The apparatus of claim 10, wherein the MIMO communication channel is above 2 GHz.

12. The apparatus of claim 7, wherein the second wireless network omits the second communication device.

13. A method for reducing interference in wireless communications, the method comprising:

selecting, at a first access point (AP) of a first wireless network, a beamforming matrix, wherein the first AP belongs to a first wireless network, and the first AP communicates with one or more first client communication devices in the first wireless network via a communication channel below 6 GHz, the first AP is communicatively coupled, via a communication link separate from the first wireless network and a second wireless network, to a second AP of the second wireless network;

determining, by the first AP, at least one of i) whether a distance between the first AP and the second AP is less than a distance threshold and ii) whether transmissions from the second wireless network meet a signal strength criteria; and in response to determining at least one of i) that the distance is less than a distance threshold and ii) that the transmissions from the second wireless network meet the signal strength criteria, determining that the second AP is near to the first AP and that transmissions from the first AP in the first wireless network are producing interference to the second wireless network;

determining, by the first AP, whether the first AP receives from the second AP or from a second client communication device in the second wireless network via the communication link and in response to the produced interference to the second wireless network, a request for the first AP to reduce interference to the second wireless network;

in response to determining that the request for the first AP to reduce interference to the second wireless network is received, determining that transmissions from the first AP in the first wireless network are producing interference to the second wireless network;

in response to determining that transmissions from the first AP in the first wireless network are producing interference to the second wireless network, reducing, by using the beamforming matrix at the first AP, the interference to the second wireless network, wherein the interference is generated by downlink transmissions from the first AP to the one or more first client communication devices;

coordinating, at the first AP, with the second AP so that the first AP uses a first beamforming matrix for a first downlink transmission when the second AP is scheduled to perform a second downlink transmission to the second client communication device in the second wireless network; and coordinating, at the first AP, with the second AP so that the first AP schedules one or more first uplink transmissions in the first wireless network at times different than when the second AP schedules one or more second uplink transmissions in the second wireless network,
wherein
the second wireless network omits the first AP,
the one or more first uplink transmissions are one or more transmissions from the one or more first communication client devices to the first AP, and
the one or more second uplink transmissions are one or more transmissions from the second client communication device or from one or more other second client communication devices in the second wireless network to the second AP.

14. The method of claim 13, wherein:
selecting the beamforming matrix comprises selecting from a plurality of pre-generated beamforming matrices in coordination with the second AP.

15. The method of claim 13, wherein using the beamforming matrix comprises using the beamforming matrix to transmit a broadcast packet from the first AP to multiple first client communications devices.

16. The method of claim 13, wherein selecting the beamforming matrix comprises selecting, at the first AP, the beamforming matrix from a plurality of pre-generated beamforming matrices.

17. The method of claim 16, wherein:
the beamforming matrix is a first beamforming matrix from the plurality of pre-generated beamforming matrices;
using the first beamforming matrix comprises using the first beamforming matrix at a first time; and
the method further comprises:
selecting, at the first AP, a second beamforming matrix from the plurality of pre-generated beamforming matrices, and
using the second beamforming matrix at the first AP at a second time for the purpose of reducing interference to the second wireless network caused by the first AP transmitting to the one or more first client communication devices via the communication channel.

18. The method of claim 17, wherein:
using the first beamforming matrix at the first time comprises using the first beamforming matrix to transmit a broadcast packet from the first AP; and
using the second beamforming matrix at the second time comprises using the second beamforming matrix to re-transmit the broadcast packet from the first AP.

19. The method of claim 13, wherein the communication channel is above 2 GHz.

20. An apparatus corresponding to a first access point (AP), the apparatus comprising:
a network interface including
i) a media access control (MAC) processing unit, and
ii) a physical layer (PHY) processing unit coupled to the MAC processing unit;
wherein
the first AP belongs to a first wireless network,
the first AP communicates with one or more first client communication devices in the first wireless network via a communication channel below 6 GHz,
the network interface is configured to
select a beamforming matrix, and
use the beamforming matrix at the first AP for the purpose of reducing interference to a second wireless network caused by the first AP transmitting to the one or more first client communication devices via the communication channel,
and wherein
the network interface is communicatively coupled, via a communication link separate from the first wireless network and the second wireless network, to a second AP of the second wireless network,
the network interface is configured to determine at least one of i) whether a distance between the first AP and the second AP is less than a distance threshold and ii) whether transmissions from the second wireless network meet a signal strength criteria,
in response to a determination of at least one of i) that the distance is less than a distance threshold and ii) that the transmissions from the second wireless network meet the signal strength criteria, determine that the second AP is near to the first AP and that transmissions from the first AP in the first wireless network are producing interference to the second wireless network,
the network interface is configured to determine whether the first AP receives from the second AP or from a second client communication device in the second wireless network via the communication link and in response to the produced interference to the second wireless network, a request for the first AP to reduce interference to the second wireless network,
in response to a determination that the request for the first AP to reduce interference to the second wireless network is received, determine that transmissions from the first AP in the first wireless network are producing interference to the second wireless network,
the network interface is configured to, in response to a determination that transmissions from the first AP in the first wireless network are producing interference to the second wireless network, reduce, by use of the beamforming matrix at the first AP, the interference to the second wireless network, wherein the interference is generated by downlink transmissions from the first AP to the one or more first client communication devices,
the network interface is configured to coordinate with the second AP so that the first AP uses the beamforming matrix for a first downlink transmission when the second AP is scheduled to perform a second downlink transmission to a second client communication device in the second wireless network, and
the network interface is configured to coordinate with the second AP so that the first AP schedules one or more first uplink transmissions in the first wireless network at times different than when the second AP schedules one or more second uplink transmissions in the second wireless network, and
the second wireless network omits the first AP,
the one or more first uplink transmissions are one or more transmissions from the one or more first client communication devices to the first AP, and
the one or more second uplink transmissions are one or more transmissions from the second client communication device or from one or more other second client communication devices in the second wireless network to ii) the second AP.

21. The apparatus of claim 20, wherein:
the network interface is configured to select the beamforming matrix from a plurality of pre-generated beamforming matrices in coordination with the second AP.

22. The apparatus of claim 20, wherein the network interface is configured to use the beamforming matrix to transmit a broadcast packet from the first AP to multiple first client communications devices.

23. The apparatus of claim 22, wherein the network interface is configured to:
use a first beamforming matrix at a first time to transmit a broadcast packet from the first AP, and
use a second beamforming matrix at a second time to re-transmit the broadcast packet from the first AP.

24. The apparatus of claim 20, wherein the network interface is configured to select the beamforming matrix from a plurality of pre-generated beamforming matrices.

25. The apparatus of claim 24, wherein:
the beamforming matrix is a first beamforming matrix from the plurality of pre-generated beamforming matrices;
the network interface is configured to:
use the first beamforming matrix at a first time,
select a second beamforming matrix from the plurality of pre-generated beamforming matrices, and
use the second beamforming matrix at the first AP at a second time for the purpose of reducing interference to the second wireless network caused by the first AP transmitting to the one or more first client communications device via the communication channel.

26. The apparatus of claim 20, wherein the communication channel is above 2 GHz.

27. A system, comprising:
a first access point (AP) of a first wireless network;
a second AP of a second wireless network that omits the first AP, wherein the first AP is communicatively coupled, via a communication link separate from the first wireless network and the second wireless network, to the second AP;
wherein
the first AP comprises a network interface including
i) a media access control (MAC) processing unit, and
ii) a physical layer (PHY) processing unit coupled to the MAC processing unit;
the first AP communicates with one or more first client communication devices in the first wireless network via a communication channel below 6 GHz,
the network interface is configured to
determine at least one of i) whether a distance between the first AP and the second AP is less than a distance threshold and ii) whether transmissions from the second wireless network meet a signal strength criteria,
in response to determining at least one of i) that the distance is less than a distance threshold and ii) that the transmissions from the second wireless network meet the signal strength criteria, determining that the second AP is near to the first AP and that transmissions from the first AP in the first wireless network are producing interference to the second wireless network,
determine whether the first AP receives from the second AP or from a second client communication device in the second wireless network via the communication link and in response to the produced interference to the second wireless network, a request for the first AP to reduce interference to the second wireless network,
in response to determining that the request for the first AP to reduce interference to the second wireless network is received, determining that transmissions from the first AP in the first wireless network are producing interference to the second wireless network,
select a beamforming matrix,
in response to a determination that transmissions from the first AP in the first wireless network are producing interference to the second wireless network, reduce, by using the beamforming matrix at the first AP, the interference to the second wireless network, wherein the interference is generated by downlink transmissions from the first AP to the one or more first client communication devices,
coordinate with the second AP so that the first AP uses the beamforming matrix for a first downlink transmission when the second AP is scheduled to perform a second downlink transmission to a second client communication device in the second wireless network, and
coordinate with the second AP so that the first AP schedules one or more first uplink transmissions in the first wireless network at times different than when the second AP schedules one or more second uplink transmissions in the second wireless network;
wherein,
the one or more first uplink transmissions are one or more transmissions from the one or more first client communication devices to the first AP, and
the one or more second uplink transmissions are one or more transmissions from the second client communication device or from one or more other second client communication devices in the second wireless network to the second AP.

28. The system of claim 27, further comprising:
a third communication device that communicatively couples the first AP to the second AP of the second wireless network.

29. The system of claim 28, wherein the third communication device is configured to:
coordinate the first AP and the second AP so that the network interface uses the beamforming matrix for the first downlink transmission when the second AP is scheduled to perform the second downlink transmission;
cause the first AP to schedule one or more first uplink transmissions in the first wireless network at times different than when the second AP schedules one or more second uplink transmissions in the second wireless network.

* * * * *